United States Patent
Matsuki

(10) Patent No.: US 10,476,732 B2
(45) Date of Patent: Nov. 12, 2019

(54) NUMBER-OF-COUPLINGS CONTROL METHOD AND DISTRIBUTING DEVICE

(71) Applicant: FUJITSU LIMITED, Kawasaki-shi, Kanagawa (JP)

(72) Inventor: Tatsuma Matsuki, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 91 days.

(21) Appl. No.: 15/800,134

(22) Filed: Nov. 1, 2017

(65) Prior Publication Data

US 2018/0152335 A1 May 31, 2018

(30) Foreign Application Priority Data

Nov. 28, 2016 (JP) ................................ 2016-229939

(51) Int. Cl.
| | |
|---|---|
| *H04L 29/06* | (2006.01) |
| *H04W 28/08* | (2009.01) |
| *H04L 12/911* | (2013.01) |
| *H04L 29/08* | (2006.01) |
| *H04L 12/24* | (2006.01) |

(52) U.S. Cl.
CPC ........ *H04L 29/06095* (2013.01); *H04L 29/06* (2013.01); *H04L 29/0809* (2013.01); *H04L 47/821* (2013.01); *H04L 67/141* (2013.01); *H04W 28/08* (2013.01); *H04L 41/22* (2013.01)

(58) Field of Classification Search
CPC ............... H04L 41/5025; H04L 67/141; H04L 67/1002; H04L 67/1008; H04L 29/06; H04L 29/06095; H04L 41/22
USPC .......................... 709/203, 223, 224, 227, 245
See application file for complete search history.

(56) References Cited

U.S. PATENT DOCUMENTS

| | | | | |
|---|---|---|---|---|
| 2002/0042828 | A1* | 4/2002 | Peiffer | H04L 29/06 709/227 |
| 2005/0102427 | A1* | 5/2005 | Yokota | H04L 67/1002 709/245 |
| 2005/0138626 | A1* | 6/2005 | Nagami | H04L 67/1008 718/105 |
| 2006/0235974 | A1* | 10/2006 | Ueda | G06F 9/5083 709/226 |

(Continued)

FOREIGN PATENT DOCUMENTS

| | | |
|---|---|---|
| JP | 2005-184165 | 7/2005 |
| WO | 2007/125942 | 11/2007 |
| WO | 2013/129061 | 9/2013 |

OTHER PUBLICATIONS

Olshefski D, Nieh J. Understanding the management of client perceived response time. InACM SIGMETRICS Performance Evaluation Review Jun. 26, 2006 (vol. 34, No. 1, pp. 240-251). ACM. (Year: 2006).*

*Primary Examiner* — James N Fiorillo
(74) *Attorney, Agent, or Firm* — Fujitsu Patent Center

(57) ABSTRACT

A number-of-couplings control method includes recording a first time from reception of a request transmitted by a first device to transmission of the request to a second device and a second time from the transmission of the request to the second device to reception of a response to the request corresponding to each of a plurality of requests, and changing an upper limit of the number of simultaneous couplings to the second device based on a comparison between a statistic of the first time and a statistic of the second time.

5 Claims, 17 Drawing Sheets

(56) References Cited

U.S. PATENT DOCUMENTS

| | | | |
|---|---|---|---|
| 2007/0299965 A1* | 12/2007 | Nieh | H04L 41/5025 |
| | | | 709/224 |
| 2009/0077233 A1* | 3/2009 | Kurebayashi | G06F 9/4843 |
| | | | 709/224 |
| 2010/0274922 A1* | 10/2010 | Reavely | H04L 67/14 |
| | | | 709/238 |
| 2012/0226804 A1* | 9/2012 | Raja | H04L 43/028 |
| | | | 709/224 |
| 2014/0304294 A1* | 10/2014 | Sharma | G06F 16/172 |
| | | | 707/769 |
| 2015/0019686 A1* | 1/2015 | Backholm | H04L 47/32 |
| | | | 709/217 |
| 2016/0337426 A1* | 11/2016 | Shribman | H04L 65/4084 |
| 2017/0147656 A1* | 5/2017 | Choudhary | H04L 67/2814 |
| 2017/0353540 A1* | 12/2017 | Nerot | H04L 67/1008 |

* cited by examiner

Sep 8 06:19:17 localhost proxy[19214]: 172.20.121.100:33070 [08/Sep/2016:06:19:16.243] nova_compute_api_cluster nova_compute_api_cluster/2-8 0/0/0/1661/1661 200 1551 - - ---- 862/78/76/3/0 0/0 "GET /v2/cf2b03db2a0c4af4a67d27593b3e3fd7/servers/4c413424-237b-4fb5-8abd-fd8d70437cb0 HTTP/1.1"

FIG. 8

| HISTORY MANAGEMENT TABLE ||||| 112 |
|---|---|---|---|---|
| CLOCK TIME | REQUEST | SERVER | PROCESSING TIME (SECOND) | WAITING TIME (SECOND) |
| 09:48:50.012 | GET /v2/servers | SV2 | 10.524 | 3.491 |
| 09:48:50.056 | POST /v2/id/server | SV3 | 8.692 | 3.215 |
| ... | ... | ... | ... | ... |
| 09:48:59.897 | HEAD /v1/user | SV1 | 18.342 | 2.873 |

FIG. 9

| STATIC TABLE | | 113 |
|---|---|---|
| 90 PERCENTILE PROCESSING TIME (SECOND) | 90 PERCENTILE WAITING TIME (SECOND) | |
| 8.54 | 3.42 | |

NUMBER-OF-COUPLINGS CONTROL METHOD AND DISTRIBUTING DEVICE

CROSS-REFERENCE TO RELATED APPLICATION

This application is based upon and claims the benefit of priority of the prior Japanese Patent Application No. 2016-229939, filed on Nov. 28, 2016, the entire contents of which are incorporated herein by reference.

FIELD

The embodiments discussed herein are related to a number-of-couplings control method and a distributing device.

BACKGROUND

Presently, an information processing system in which plural information processing devices communicate through a network is utilized. For example, in a client-server system, a device that offers services (referred to as server) and a device that utilizes the services (referred to as client) communicate through a network. The client transmits a request to the server. The server receives the request and transmits a response according to the request to the client.

The server is capable of receiving plural requests from plural clients. When the number of requests increases, the load of the server increases. If the load of the server becomes excessive, the delay of the response to the client possibly increases. Therefore, a method in which a control device that receives a request of a client and makes access to a server by proxy is provided between the client and the server and the load of the server is suppressed by functions of the control device is being considered.

For example, there has been a proposal of a traffic control device that limits transmission of the request to a server based on the maximum number of couplings that is the allowable maximum number of clients that may simultaneously couple to the server. In this proposal, the maximum number of couplings is set in advance by an operator.

Furthermore, there has also been a proposal of a load control device that limits the number of response-waiting requests that have been transmitted to a server but about each of which a response has not been returned from the server. If the number of response-waiting requests reaches a threshold, the load control device temporarily accumulates a received request in a buffer and waits to transmit the request from the buffer until the number of response-waiting requests falls below the threshold.

There has also been a proposal of database server that calculates the critical multiplicity that is the upper limit value of processing processes for which processing is simultaneously advanced concurrently from the operating status of own hardware and controls the number of simultaneous couplings from clients to the database server while deeming the calculated critical multiplicity as the upper limit.

CITATION LIST

Patent Documents

[Patent Document 1] Japanese Laid-open Patent Publication No. 2005-184165
[Patent Document 2] International Publication Pamphlet No. WO 2007/125942
[Patent Document 3] International Publication Pamphlet No. WO 2013/129061

SUMMARY

According to an aspect of the embodiment, a number-of-couplings control method includes recording a first time from reception of a request transmitted by a first device to transmission of the request to a second device and a second time from the transmission of the request to the second device to reception of a response to the request corresponding to each of a plurality of requests, and changing an upper limit of the number of simultaneous couplings to the second device based on a comparison between a statistic of the first time and a statistic of the second time.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 7 is a diagram illustrating an example of a log output by a proxy processing unit;
FIG. 8 is a diagram illustrating an example of a history management table;
FIG. 9 is a diagram illustrating an example of a statistic table.

DESCRIPTION OF EMBODIMENTS

As described above, it is conceivable that transmission of the request to a server is limited by setting the upper limit of the number of simultaneous couplings to the server in a given device and a request of the limitation target is buffered on this device until room is made regarding the number of couplings. Here, the upper limit of the number of simultaneous couplings affects the quality of service of the system.

For example, when the upper limit of the number of simultaneous couplings is larger, the frequency of reception of a request at the server increases more readily. If the frequency of reception of a request at the server increases, increase in the time of waiting for processing of the request at the server is caused and the delay of the response to the client deteriorates.

On the other hand, when the upper limit of the number of simultaneous couplings is smaller, waiting for room regarding the number of couplings occurs more readily. If the time of waiting to forward a request on the device that makes access to the server by proxy increases due to the waiting for room, the delay of the response to the client deteriorates.

Therefore, for example, it is conceivable that a user makes a preliminary survey of the use status of services and sets the upper limit of the number of simultaneous couplings in advance based on prediction of the use status in the future. However, the environment in actual operation is not necessarily the same as the environment in the preliminary survey. For example, the device configuration or the use status of services often changes over time even in the same system. For this reason, the initial setting of the upper limit of the number of simultaneous couplings is not necessarily favorable setting also at later timing in terms of keeping the quality of service.

In one aspect, the embodiments discussed herein intend to enable adjustment of the number of simultaneous couplings to suppress the deterioration of the response performance.

The embodiments will be described below with reference to the drawings.

First Embodiment

Figure 1:
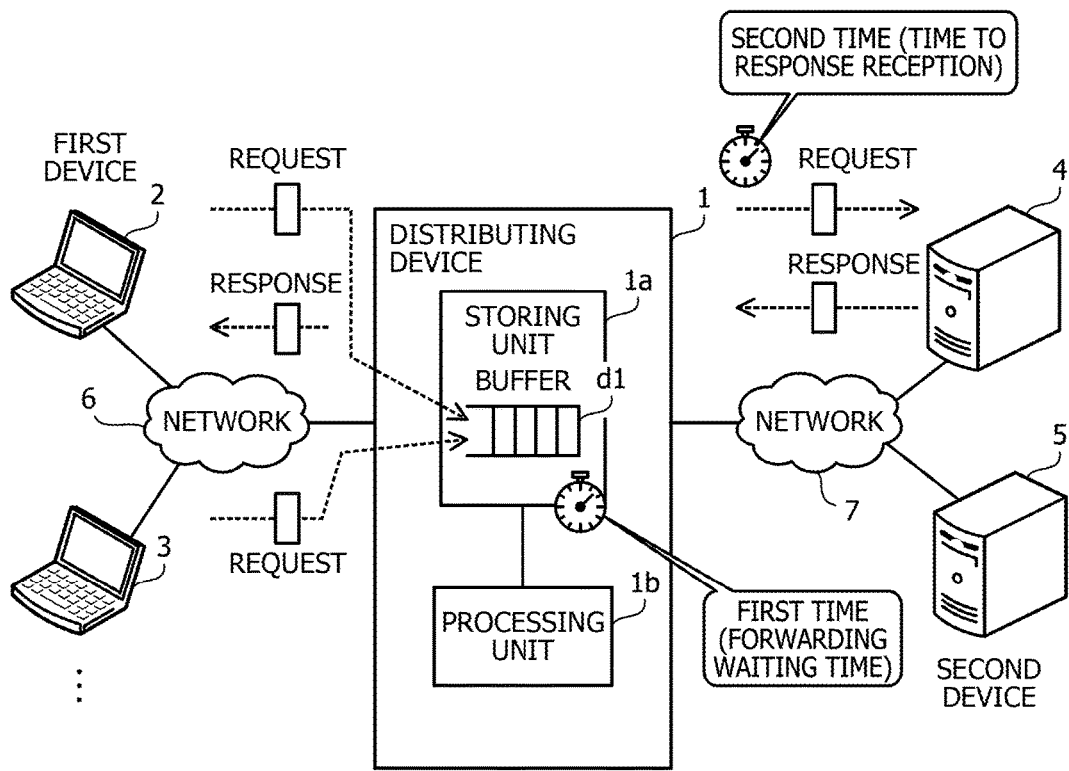
FIG. 1 is a diagram illustrating a distributing device of a first embodiment.
Figure 1:
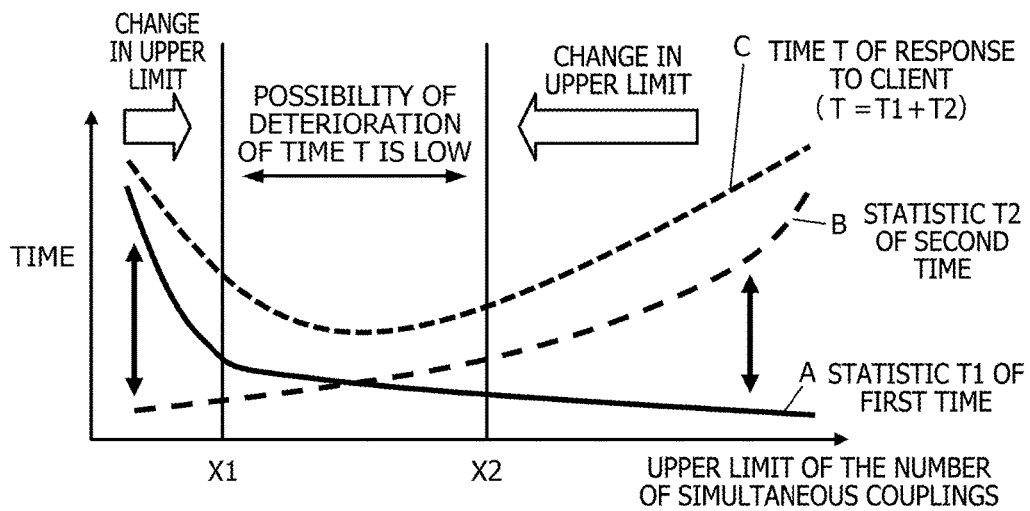

FIG. 1 is a diagram illustrating a distributing device of a first embodiment. A distributing device 1 communicates with first devices 2 and 3 and second devices 4 and 5. The distributing device 1 and the first devices 2 and 3 are coupled to a network 6. The distributing device 1 and the second devices 4 and 5 are coupled to a network 7. The first devices 2 and 3 may be referred to as client computers or clients. The second devices 4 and 5 may be referred to as server computers or servers. The second devices 4 and 5 offer the same services. The number of first devices 2 and 3 and the number of second devices 4 and 5 may be three or more.

The distributing device 1 receives requests from the first devices 2 and 3 and distributes the received requests to the second devices 4 and 5 to balance the load of the second devices 4 and 5. For example, the distributing device 1 selects the transmission destination of the request from the second devices 4 and 5 (transmission destination candidates) based on a given distribution rule and transmits the request to the selected transmission destination. The distributing device 1 receives responses to the requests from the second devices 4 and 5. The distributing device 1 transmits the responses to the first devices 2 and 3 that are the transmission sources of the requests. The distributing device 1 may be referred to as a load balancing device.

For the rule of distribution by the distributing device 1, various methods are conceivable. The distribution rule is round-robin (transmission destination candidates are selected in turn), least connection (transmission destination candidate whose number of existing Transmission Control Protocol (TCP) connections is the smallest is selected), or the like.

Here, various parameters are set in the distributing device 1 in order to suppress the deterioration of the Quality of Service (QoS). As one of the parameters, the maximum number of simultaneous couplings exists. Here, "the number of simultaneous couplings" is calculated based on the number of requests (response-waiting requests) that have been transmitted to a certain one second device 4 or 5 but about each of which a response has not been received. The number of response-waiting requests may be considered as the number of simultaneous couplings. The maximum number of simultaneous couplings is the upper limit of the number of response-waiting requests (for example, the number of simultaneous couplings) per one of the second devices 4 and 5.

When receiving a request, the distributing device 1 stores the request in a given buffer. The distributing device 1 excludes the device whose number of simultaneous couplings reaches the maximum number of simultaneous couplings in the second devices 4 and 5 from the candidates for the transmission destination of the request. If both the second devices 4 and 5 are excluded from the transmission destination candidates, the request is not immediately transmitted. For this reason, the distributing device 1 holds the request in the buffer until room is made regarding the number of simultaneous couplings in either the second device 4 or 5. The request stored in the buffer is often referred to as a "forwarding-waiting request."

The distributing device 1 offers a function of dynamically changing the maximum number of simultaneous couplings. The distributing device 1 includes a storing unit 1a and a processing unit 1b.

The storing unit 1a may be a volatile storing device such as a random access memory (RAM) or may be a non-volatile storing device such as a flash memory. The processing unit 1b may include a central processing unit (CPU), a digital signal processor (DSP), an application specific integrated circuit (ASIC), a field programmable gate array (FPGA), and so forth. The processing unit 1b may be a processor that executes a program. The processor may include a collection of plural processors (multiprocessor).

The storing unit 1a includes a buffer dl. The buffer dl stores forwarding-waiting requests. The storing unit 1a stores a first time and a second time regarding each of the second devices 4 and 5. The first time is the forwarding waiting time of a request in the buffer dl (time from storing in the buffer dl to forwarding). The second time is the time from transmission of a request to the second device 4 or 5 to reception of a response to this request from the second device 4 or 5. In the second time, the influence of processing delay of the second device 4 or 5 and the influence of communication delay in the network 7 are reflected. The communication delay in the network 7 is small compared with the processing delay of the second device 4 or 5. Thus, the second time may be referred to as the processing time of the request by the second device 4 or 5.

The processing unit 1b executes distribution processing of requests received from the first devices 2 and 3. For example, the processing unit 1b receives a request from the first device 2. The processing unit 1b decides the transmission destination of the request from the transmission destination candidates regarding which the present number of simultaneous couplings does not reach the maximum number of simultaneous couplings in the second devices 4 and 5 in accordance with the distribution rule.

If the present number of simultaneous couplings reaches the maximum number of simultaneous couplings regarding all of the second devices 4 and 5, the processing unit 1b stores the request in the buffer dl and waits until room is made regarding the number of simultaneous couplings. If requests have been already stored in the buffer dl, when room is made regarding the number of simultaneous couplings in the second device 4, for example, the processing unit 1b takes out the request from the buffer dl from the oldest request sequentially and transmits the request to this second device 4. When receiving a response to the request from the second device 4, the processing unit 1b transmits the response to the first device 2 that is the transmission source of this request.

The processing unit 1b records the first time from reception of the request transmitted by the first device 2 to transmission of this request to the second device 4 in the storing unit 1a regarding each of plural requests. Furthermore, the processing unit 1b records the second time from transmission of the request to the second device 4 to reception of a response to this request in the storing unit 1a regarding each of the plural requests. In the example of the first embodiment, the plural second devices 4 and 5 exist and thus the processing unit 1b may record the first time and the second time in association with identification information of each of the second devices 4 and 5.

The processing unit 1b changes the upper limit of the number of simultaneous couplings to the second devices 4 and 5 according to comparison between a statistic T1 of the first time and a statistic T2 of the second time. For example, the change is made as follows.

In FIG. 1, an example of the relationship between the first time and the second time with respect to the upper limit of the number of simultaneous couplings is illustrated. Series A represents the relationship of the statistic T1 of the first time with respect to the upper limit X of the number of simultaneous couplings (T1(X)). Series B represents the relationship of the statistic T2 of the second time with respect to the upper limit X of the number of simultaneous couplings (T2(X)). Here, as the statistic, a percentile value (90 percentile value or the like), an average, or the like is conceivable.

Series C represents the relationship of a time T with respect to the upper limit X of the number of simultaneous couplings (T(X)). The time T=T1+T2 is satisfied. For example, the time T is the time from reception of a request from the first device 2 (or first device 3) by the processing unit 1b to sending of a response to this request to the first device 2 (or first device 3) (time of the response to the client).

According to series A, the forwarding waiting time (first time) increases as the upper limit X of the number of simultaneous couplings becomes smaller. This is because the number of requests that wait to be forwarded increases in the distributing device 1. On the other hand, according to series B, the processing time of the request by the second device 4 or 5 (second time) decreases as the upper limit X of the number of simultaneous couplings becomes smaller. This is because the number of requests simultaneously assigned per one of the second devices 4 and 5 decreases and the load of the second devices 4 and 5 becomes smaller. Furthermore, according to series C, as the upper limit X of the number of simultaneous couplings becomes smaller, the time of the response to the client increases with the forwarding waiting time being the cause.

Moreover, according to series A, the forwarding waiting time (first time) decreases as the upper limit X of the number of simultaneous couplings becomes larger. This is because the number of requests that wait to be forwarded decreases. On the other hand, according to series B, the processing time of the request by the second device 4 or 5 (second time) increases as the upper limit X of the number of simultaneous couplings becomes larger. This is because the number of requests simultaneously assigned per one of the second devices 4 and 5 increases and the load of the second devices 4 and 5 becomes larger. Furthermore, according to series C, as the upper limit X of the number of simultaneous couplings becomes larger, the time of the response to the client increases with the processing time of the request by the second device 4 or 5 being the cause.

Furthermore, according to series A and B, when the upper limit of the number of simultaneous couplings is approximately X1 to X2, both the forwarding waiting time and the processing time of the request by the second device 4 or 5 are comparatively short. The time T takes the minimum value in the range of X1 to X2 of the upper limit of the number of simultaneous couplings. For example, the possibility that the time T deteriorates is low when the upper limit of the number of simultaneous couplings is in the range of approximately X1 to X2.

Here, for example, it is conceivable that such a relationship is preliminarily surveyed and the upper limit of the number of simultaneous couplings with which the time T becomes the minimum is set in the distributing device 1 in advance. However, the environment at the time of the survey is not necessarily kept also at later timing. For example, the above-described relationship possibly changes if the number of first devices 2 and 3 increases or decreases or if the number of second devices 4 and 5 increases. Furthermore, the environment at the time of the survey does not necessarily correspond with the environment in actual operation. As above, with the static setting based on the preliminary survey or the like, there is a possibility that it is difficult to suppress the deterioration of the quality of service.

Therefore, the processing unit 1b pays attention to a certain tendency observed in series A, B, and C and changes the upper limit of the number of simultaneous couplings. For example, according to series A and B, the statistic T1 of the first time tends to be large relative to the statistic T2 of the second time (difference between the statistics T1 and T2 becomes larger) when the upper limit of the number of simultaneous couplings is smaller. Meanwhile, according to series A and B, the statistic T2 of the second time tends to be large relative to the statistic T1 of the first time (difference between the statistics T1 and T2 becomes larger) when the upper limit of the number of simultaneous couplings is larger. Therefore, the processing unit 1b compares the statistics T1 and T2 and changes the upper limit of the number of simultaneous couplings if there is a difference between the statistics T1 and T2.

For example, the processing unit 1b increases the upper limit of the number of simultaneous couplings if the statistic T1 of the first time is equal to or larger than the statistic T2 of the second time. Meanwhile, the processing unit 1b decreases the upper limit of the number of simultaneous couplings if the statistic T1 of the first time is smaller than the statistic T2 of the second time. The purpose of such a change is to shift the time T to a value close to the minimum value.

The processing unit 1b may obtain the statistics T1 and T2 without discriminating the second devices 4 and 5 and obtain the upper limit of the number of simultaneous couplings regarding the group of the second devices 4 and 5. In this case, for example, the processing unit 1b may divide this upper limit by the number of second devices (two, in this example) and thereby define the upper limit of the number of simultaneous couplings regarding each of the second devices 4 and 5. Alternatively, the processing unit 1b may discriminate the second devices 4 and 5 and obtain the statistics T1 and T2 regarding each of the second devices 4 and 5 to calculate the upper limit of the number of simultaneous couplings regarding each of the second devices 4 and 5.

Moreover, the processing unit 1b may decide the amount of change in the upper limit of the number of simultaneous couplings according to the difference between the statistic T1 of the first time and the statistic T2 of the second time. For example, the processing unit 1b may set the amount of change larger when the difference is larger. The processing unit 1b may set the amount of change smaller when the difference is smaller. The purpose of this operation is to bring the time T close to the minimum value early and keep the state in which the time T is comparatively short for a long time.

As above, the processing unit 1b may adjust the upper limit of the number of simultaneous couplings to suppress the deterioration of the response performance by dynamically changing the upper limit of the number of simultaneous couplings to the second devices 4 and 5. If the load of the second devices 4 and 5 especially varies depending on the time or if failure especially occurs, the deterioration of the time of the response to the client may be suppressed compared with the case of statically setting the upper limit of the number of simultaneous couplings by a preliminary survey or the like. As a result, improvement in the quality of service by the distributing device 1 and the second devices 4 and 5 may be intended.

In the following, an example in which functions of the distributing device 1 are applied to a system that offers cloud services will be represented and these functions will be described more, for example.

Second Embodiment

Figure 2:
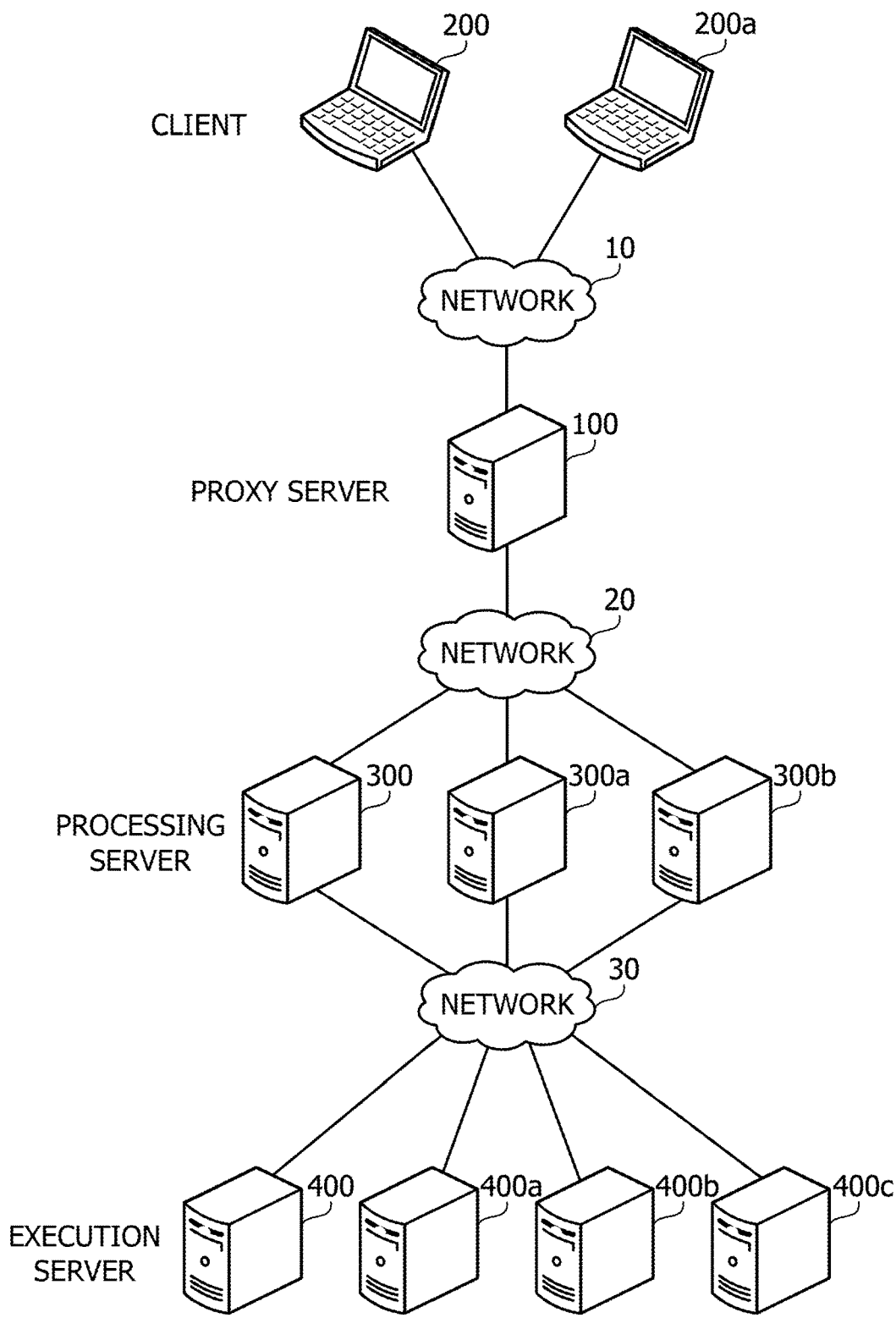
FIG. 2 is a diagram illustrating an example of an information processing system of a second embodiment.

FIG. 2 is a diagram illustrating an example of an information processing system of a second embodiment. The information processing system of the second embodiment includes a proxy server 100, clients 200 and 200a, processing servers 300, 300a, and 300b, and execution servers 400, 400a, 400b, and 400c.

The proxy server 100 and the clients 200 and 200a are coupled to a network 10. The network 10 may be the Internet or a wide area network (WAN). Alternatively, the network 10 may be a local area network (LAN). The proxy server 100 and the processing servers 300, 300a, and 300b may be coupled to a network 20. The processing servers 300, 300a, and 300b and the execution servers 400, 400a, 400b, and 400c are coupled to a network 30. The networks 20 and 30 are each a LAN in a data center, for example.

The proxy server 100 is a server computer that receives requests from the clients 200 and 200a and distributes the received requests to the processing servers 300, 300a, and 300b. The proxy server 100 is one example of the distributing device 1 of the first embodiment.

The clients 200 and 200a are client computers that transmit requests to Web services offered by the processing servers 300, 300a, and 300b. The requests by the clients 200 and 200a are received by the proxy server 100 and are forwarded to any of the processing servers 300, 300a, and 300b at the subsequent stage of the proxy server 100. The number of clients may be three or more. The clients 200 and 200a are one example of the first devices 2 and 3 of the first embodiment.

The processing servers 300, 300a, and 300b are server computers that offer the common Web services to the clients 200 and 200a. The load of the processing servers 300, 300a, and 300b is balanced by the proxy server 100. The number of processing servers 300, 300a, and 300b may be two or four or more. The processing servers 300, 300a, and 300b are one example of the second devices 4 and 5 of the first embodiment.

The execution servers 400, 400a, 400b, and 400c are server computers that may execute a virtual machine (VM). For example, the execution servers 400, 400a, 400b, and 400c execute software called a hypervisor. The hypervisor of the execution server 400 allocates hardware resources such as a RAM and a processor included in the execution server 400 to the virtual machine (this is the same also in the other execution servers). The respective virtual machines on the execution servers 400, 400a, 400b, and 400c execute given processing in response to instructions by the processing servers 300, 300a, and 300b and provide the processing result to the processing servers 300, 300a, and 300b.

For example, it is also possible for the clients 200 and 200a to transmit, to the proxy server 100, a request for making an instruction to activate a new virtual machine by any of the execution servers 400, 400a, 400b, and 400c and a request for work processing by use of the virtual machine. The use form in which, as above, a computer is not possessed on the user side and resources of a computer installed on the data center side are used through a network is often referred to as cloud computing.

As one of software platforms that implement services to provide an environment of the cloud computing (often referred to as cloud services), OpenStack (registered trademark) is cited, for example. In the OpenStack, an Application Programming Interface (API) called the Representational State Transfer (REST) API is used. In the REST API, a resource on a system is represented by an identifier called the Uniform Resource Identifier (URI). Furthermore, the contents of processing to a resource are specified by the Hypertext Transfer Protocol (HTTP) method (GET, POST, and so forth). The clients 200 and 200a issue a request in which the HTTP method and the URI are specified and receive a response of a given format to this request.

For example, a request to acquire an authentication token is represented as "POST/v3/auth/tokens." The "POST" part is the HTTP method and the part subsequent thereto is the URI. Furthermore, for example, a request to acquire a list of virtual machines that have been already activated is represented as "GET/servers/detail." Moreover, for example, a request to make an instruction to create a virtual network is represented as "POST/v2.0/networks." The URI corresponding to the resource is arbitrarily defined according to the system.

Figure 3:
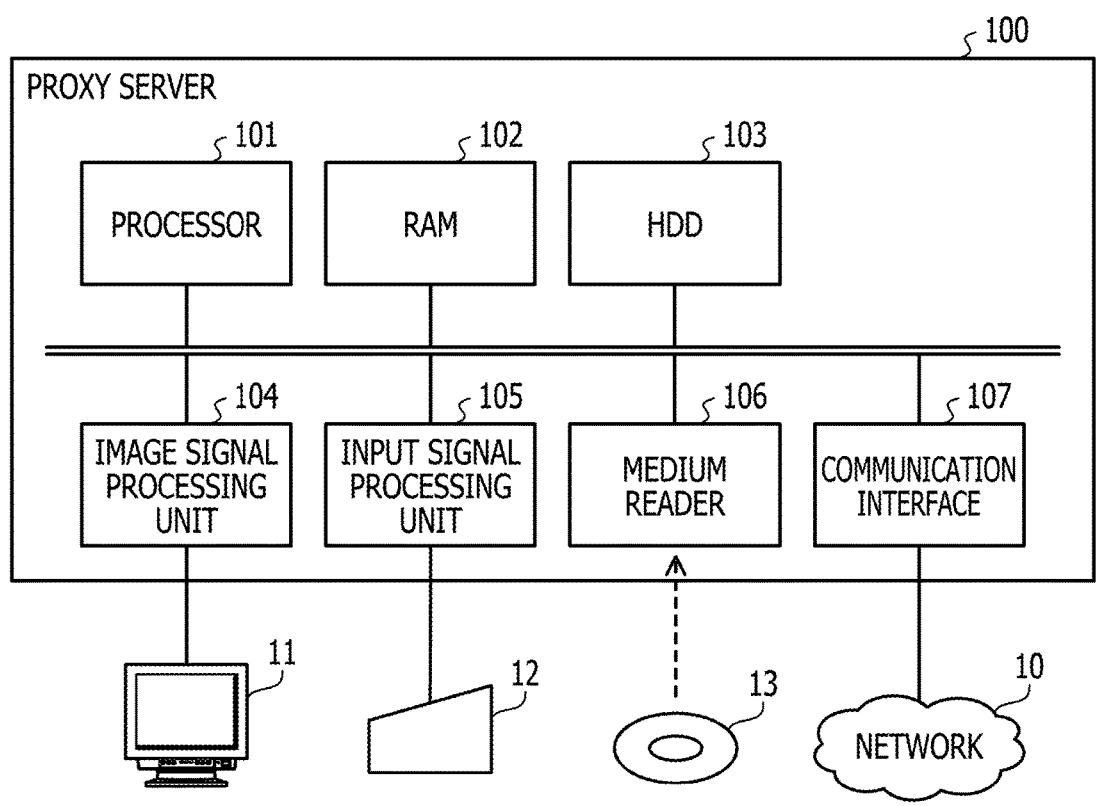
FIG. 3 is a diagram illustrating a hardware example of a proxy server of the second embodiment.

FIG. 3 is a diagram illustrating a hardware example of a proxy server of the second embodiment. The proxy server 100 includes a processor 101, a RAM 102, a hard disk drive (HDD) 103, an image signal processing unit 104, an input signal processing unit 105, a medium reader 106, and a communication interface 107. Each piece of hardware is coupled to a bus of the proxy server 100.

The processor 101 is hardware that controls information processing of the proxy server 100. The processor 101 may be a multiprocessor. The processor 101 is a CPU, DSP, ASIC, FPGA, or the like. The processor 101 may be a combination of two or more elements among CPU, DSP, ASIC, FPGA, and so forth.

The RAM 102 is a main storing device of the proxy server 100. The RAM 102 temporarily stores at least part of a program of an operating system (OS) and an application program to be executed by the processor 101. Furthermore, the RAM 102 stores various kinds of data used for processing by the processor 101.

The HDD 103 is an auxiliary storing device of the proxy server 100. The HDD 103 magnetically carries out writing and reading of data to and from a built-in magnetic disk. The HDD 103 stores the program of the OS, application programs, and various kinds of data. The proxy server 100 may include another kind of auxiliary storing device such as a solid state drive (SSD) and may include plural auxiliary storing devices.

The image signal processing unit 104 outputs an image to a display 11 coupled to the proxy server 100 in accordance with a command from the processor 101. As the display 11, a cathode ray tube (CRT) display, a liquid crystal display, or the like may be used.

The input signal processing unit 105 acquires an input signal from an input device 12 coupled to the proxy server 100 and outputs the input signal to the processor 101. As the input device 12, pointing devices such as a mouse and a touch panel, a keyboard, and so forth may be used.

The medium reader 106 is a device that reads a program or data recorded in a recording medium 13. As the recording medium 13, magnetic disks such as a flexible disk (FD) and an HDD, optical discs such as a compact disc (CD) and a digital versatile disc (DVD), and a magneto-optical disk (MO) may be used. Furthermore, it is also possible to use a non-volatile semiconductor memory such as a flash memory card as the recording medium 13. The medium reader 106 stores the program or data read from the recording medium 13 in the RAM 102 or the HDD 103 in accordance with a command from the processor 101, for example.

The communication interface 107 communicates with another device through the network 10. The communication interface 107 may be a wired communication interface or may be a wireless communication interface.

The clients 200 and 200a, the processing servers 300, 300a, and 300b, and the execution servers 400, 400a, 400b, and 400c may also be implemented by using hardware similar to the proxy server 100.

Figure 4:
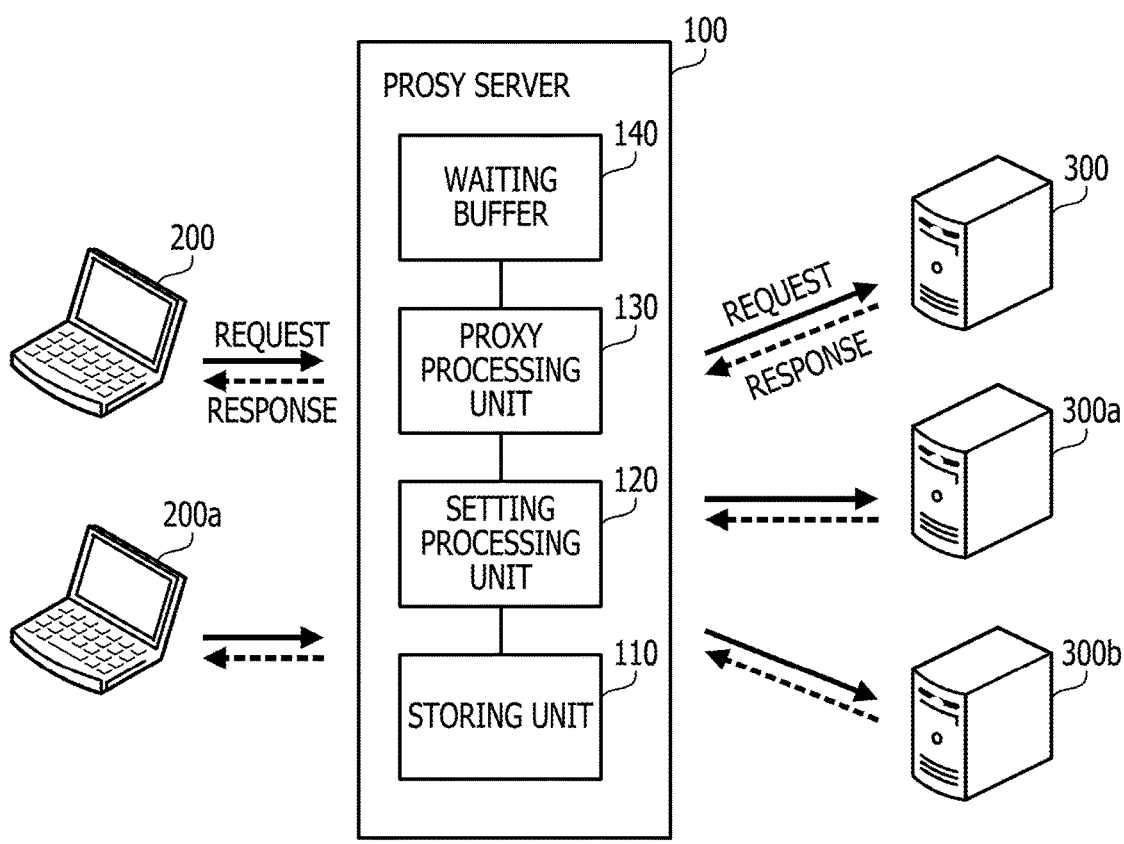
FIG. 4 is a diagram illustrating a function example of a proxy server.

FIG. 4 is a diagram illustrating a function example of a proxy server. The proxy server 100 includes a storing unit 110, a setting processing unit 120, a proxy processing unit 130, and a waiting buffer 140. The storing unit 110 is implemented by using a storage area of the RAM 102 or the HDD 103. The setting processing unit 120 and the proxy processing unit 130 are implemented through execution of a program stored in the RAM 102 by the processor 101. The waiting buffer 140 is implemented by using a storage area of the RAM 102.

The storing unit 110 stores a log that is output by the proxy processing unit 130 and relates to a request and a response. Furthermore, the storing unit 110 stores the forwarding waiting time of the request on the proxy server 100 (referred to as the proxy waiting time). Moreover, the storing unit 110 stores the time to reception of the response to the request transmitted from the proxy server 100 to the processing server 300, 300a, or 300b by the proxy server 100 (referred to as the server processing time).

The setting processing unit 120 analyzes the log output by the proxy processing unit 130 and thereby acquires the proxy waiting time and the server processing time regarding each request to store the proxy waiting time and the server processing time in the storing unit 110. The setting processing unit 120 calculates a statistic of the proxy waiting time and a statistic of the server processing time at given timing and changes the maximum number of simultaneous couplings to the processing servers 300, 300a, and 300b according to comparison between both statistics. The maximum number of simultaneous couplings is a parameter used for distribution processing of requests by the proxy processing unit 130.

The proxy processing unit 130 balances the load of the processing servers 300, 300a, and 300b by distributing requests received from the clients 200 and 200a to the processing servers 300, 300a, and 300b. The proxy processing unit 130 distributes requests based on a load balancing rule such as round-robin or least connection (request is distributed to the processing server whose number of existing TCP connections is the smallest).

In the parameters used by the proxy processing unit 130 for the distribution processing, the maximum number of simultaneous couplings, the request timeout time (upper limit of the response waiting time), the number of times of retry (upper limit of the number of times of retry), and so forth are included. Here, attention is focused on the maximum number of simultaneous couplings. The maximum number of simultaneous couplings is the upper limit of the number of simultaneous couplings to the processing servers 300, 300a, and 300b. "The number of simultaneous couplings" is equivalent to the number of requests (response-waiting requests) that have been transmitted to a certain processing server 300, 300a, or 300b but about each of which a response has not been received. For example, it may be said that the maximum number of simultaneous couplings is the upper limit of the number of response-waiting requests with respect to one processing server.

When receiving a new request, the proxy processing unit 130 stores the received request in the waiting buffer 140 (queue). The proxy processing unit 130 decides the forwarding destination of the request based on the load balancing rule and transmits the request stored in the waiting buffer 140 to the decided forwarding destination. However, if the number of response-waiting requests reaches the maximum number of simultaneous couplings in all of the processing servers 300, 300a, and 300b, the proxy processing unit 130 waits for room regarding the number of simultaneous couplings in any of the processing servers 300, 300a, and 300b. When room is made regarding the number of simultaneous couplings in any of the processing servers 300, 300a, and 300b, the proxy processing unit 130 transmits the request stored in the waiting buffer 140 to the processing server 300, 300a, or 300b in which the room exists regarding the number of simultaneous couplings.

The number of connections when the proxy processing unit 130 uses the least connection as the load balancing rule may be considered as the number of response-waiting requests (proxy processing unit 130 may distribute a new request to the processing server 300, 300a, or 300b whose number of response-waiting requests is the smallest). This is because, if a response-waiting request exists, the TCP connection corresponding to the communication of this request also remains without being released.

For example, when receiving a new request, the proxy processing unit 130 obtains the numbers of requests about each of which a response has not been received (the numbers of response-waiting requests) among requests that have been transmitted to the processing servers 300, 300a, and 300b.

Then, the proxy processing unit 130 may limit transmission of the received request to the processing server 300, 300a, or 300b according to comparison between the number of response-waiting requests and the maximum number of simultaneous couplings. For example, the proxy processing unit 130 may carry out control in such a manner that the new request is distributed to the processing server 300, 300a, or 300b whose number of response-waiting requests does not reach the maximum number of simultaneous couplings and the new request is not distributed to the processing server 300, 300a, or 300b whose number of response-waiting requests reaches the maximum number of simultaneous couplings.

Furthermore, functions of the proxy processing unit 130 may be implemented through execution of software that is stored in the RAM 102 and is called HAProxy by the processor 101, for example. The HAProxy is software that offers a load balancing function.

The waiting buffer 140 is a buffer used to hold requests received by the proxy processing unit 130. The requests are stored in the waiting buffer 140 based on a data structure of a queue. For example, the proxy processing unit 130 takes out the requests in turn from the request stored in the waiting buffer 140 first, and transmits the request to the processing server 300, 300a, or 300b of the forwarding destination.

Figure 5:
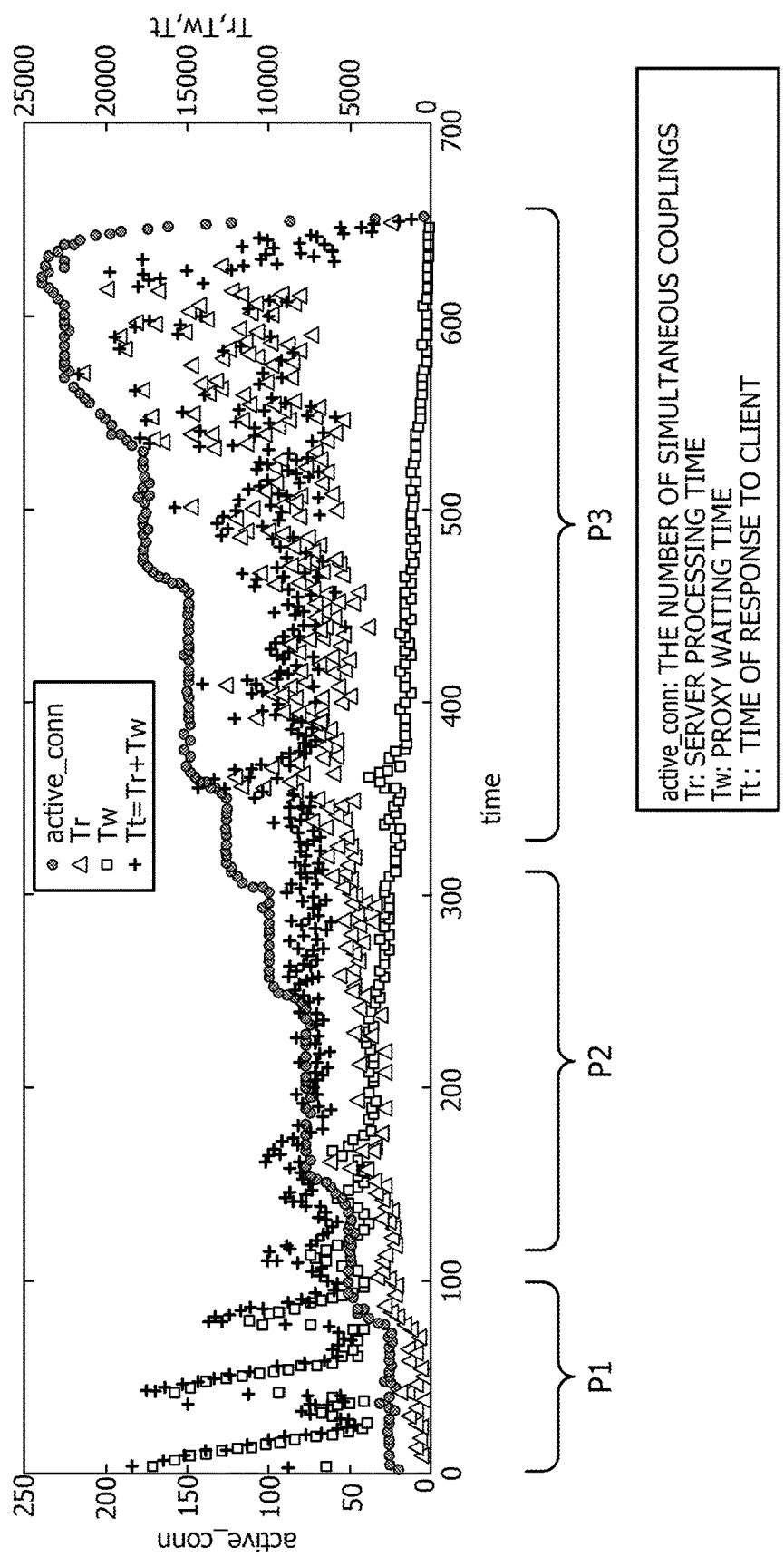
FIG. 5 is a diagram illustrating an example of a measurement result of respective times with respect to the maximum number of simultaneous couplings.

FIG. 5 is a diagram illustrating an example of a measurement result of respective times with respect to the maximum number of simultaneous couplings. In FIG. 5, the abscissa axis is the time. The left ordinate axis is the number of simultaneous couplings (active_conn). The right ordinate axis is the time (Tr, Tw, Tt) (milliseconds). Here, Tr is the server processing time. Tw is the proxy waiting time. Tt is the time of the response to the client and Tt=Tr+Tw is satisfied. The respective series of active_conn, Tr, Tw, and Tt represent the result of the case in which a large number of requests are transmitted to the proxy server 100 while the maximum number of simultaneous couplings of the processing servers 300, 300a, and 300b are increased in a stepwise manner according to time elapse. The series of Tr is the 99 percentile value of the server processing time at every ten seconds. The series of Tw is the 99 percentile value of the proxy waiting time at every ten seconds.

According to the measurement result of FIG. 5, the following facts are understood.

In a period P1, the maximum number of simultaneous couplings is set comparatively small and thus the proxy waiting time (Tw) increases comparatively greatly.

In a period P2, the sum (Tt) of the server processing time (Tr) and the proxy waiting time (Tw) is stable at a comparatively-small value.

In a period P3, the maximum number of simultaneous couplings is set comparatively large. Therefore, resource competition in the processing servers 300, 300a, and 300b occurs and the server processing time (Tr) increases comparatively greatly.

Figure 6:
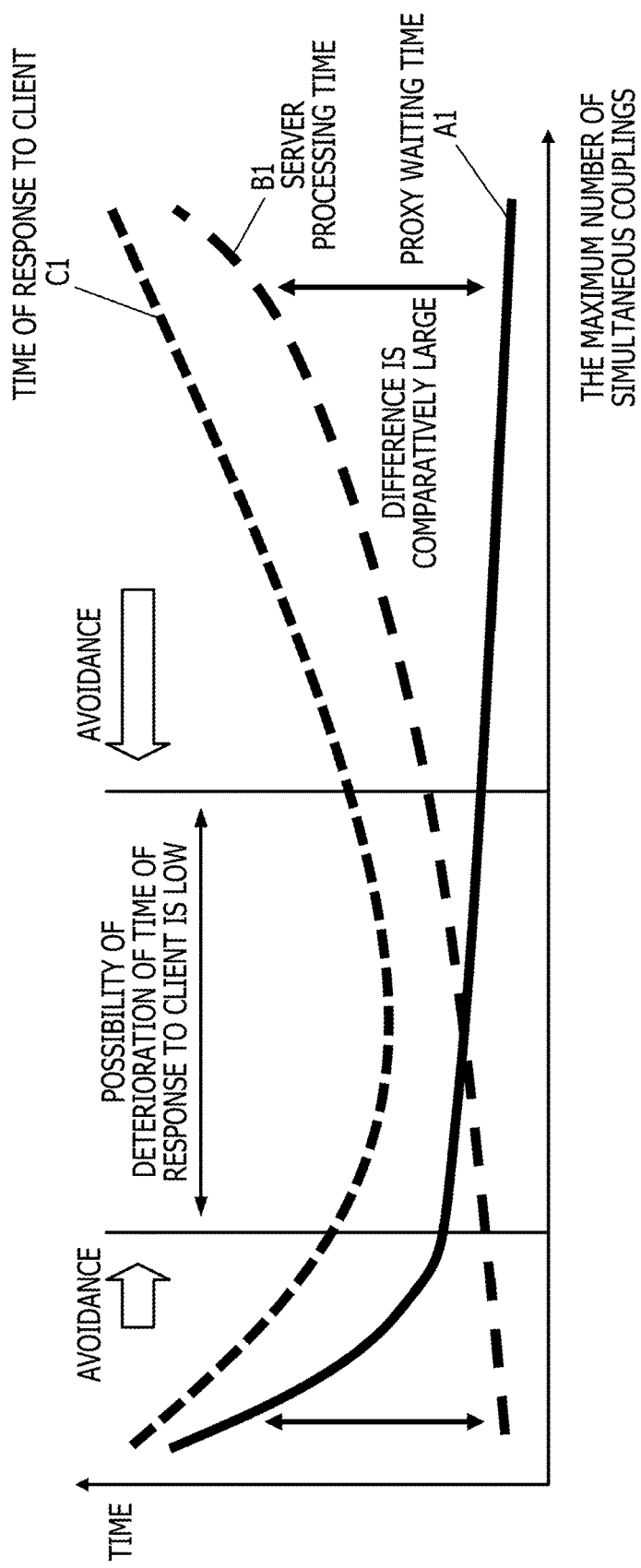
FIG. 6 is a diagram illustrating an example of a relationship between the maximum number of simultaneous couplings and respective times.

FIG. 6 is a diagram illustrating an example of a relationship between the maximum number of simultaneous couplings and respective times. According to the measurement result of FIG. 5, the relationships of Tw, Tr, and Tt with respect to the maximum number of simultaneous couplings are represented by series A1, B1, and C1, respectively. According to series A1 and B1, it turns out that the server processing time and the proxy waiting time are in a trade-off relationship. The time of the response to the client (Tt=Tr+Tw) tends to greatly deteriorate under a situation in which there is a comparatively-large difference between the server processing time and the proxy waiting time. On the other hand, under a situation in which the difference between the server processing time and the proxy waiting time is comparatively small, the possibility that the time of the response to the client deteriorates tends to be low. Even when the whole of the series A1, B1, and C1 is shifted in the abscissa axis direction of the graph (leftward or rightward) in response to change in the configuration of the system (increase or decrease in the number of clients, increase or decrease in the number of processing servers, or the like), the tendency that the response time Tt also becomes shorter when the difference between the statistics Tr and Tw is smaller is the same. Therefore, based on the relationship of FIG. 6, the setting processing unit 120 sets the maximum number of simultaneous couplings to avoid the situation in which the time of the response to the client deteriorates.

Next, a concrete example of information processed by the proxy server 100 will be described.

FIG. 7 is a diagram illustrating an example of a log output by a proxy processing unit. A log 111 is output by the proxy processing unit 130. The log 111 is stored in the storing unit 110. One record included in the log 111 includes plural fields. Each field is marked out by spaces. The values of the respective fields exemplified in the log 111 represent the following information.

"proxy [19214]" is the process name (proxy) and the process identifier (ID) (19214) of the proxy processing unit 130.

"172.20.121.100:33070" is the Internet Protocol (IP) address and the port number of the client of the transmission source of the relevant request.

"[08/Sep/2016:06:19:16.243]" is the clock time when the relevant request has been accepted by the proxy processing unit 130.

"nova_compute_api_cluster" is the front-end name described in a given setting file stored in the storing unit 110.

"nova_compute_api_cluster/2-8" is information on the processing server of the distribution destination of the relevant request (format of back-end name/server name).

The meanings of the respective values marked out by slash symbols "/" in "0/0/0/1661/1661" are as follows. The first value is the time for which the client has waited to transmit the whole of the HTTP request. The second value is the forwarding waiting time (proxy waiting time) in the waiting buffer 140 on the proxy server 100. The third value is the time it has taken to establish a coupling to the back-end server (processing server) (including retry). The fourth value is the time of the response from the back-end server (processing server) (equivalent to the server processing time). The fifth value is the total time taken until the response to the client (equivalent to the time of the response to the client).

"200" is the HTTP status code.

"1551" is the number of bytes transmitted as the response to the client.

The respective values marked out by slash symbols in "862/78/76/3/0" represent the following numbers sequentially from the first value. For example, the numbers are "the number of currently-established connections/the number of currently-established connections of the front-end/the number of currently-established connections of the back-end/the number of currently-established connections of the back-end servers/the number of times of retry of the coupling to the back-end server."

The respective values marked out by a slash symbol in "0/0" represent the following numbers sequentially from the first value. For example, the numbers are "the number of requests that are waiting in a server queue/the number of requests that are waiting in a queue of the whole of the back-end."

"GET/v2/cf2b03db . . . HTTP/1.1" represents the concrete contents of the request (HTTP request).

FIG. 8 is a diagram illustrating an example of a history management table. A history management table 112 is stored in the storing unit 110. The history management table 112 includes items of clock time, request, server, processing time, and waiting time.

In the item of the clock time, the reception clock time of the request is registered. In the item of the request, the concrete contents of the request are registered. In the item of the server, identification information of the processing server that has become the distribution destination of the relevant request is registered. For example, the identification information of the processing server 300 is "SV1." The identification information of the processing server 300a is "SV2." The identification information of the processing server 300b is "SV3." In the item of the processing time, the server processing time relating to the relevant request is registered. In the item of the waiting time, the proxy waiting time is registered. The unit of the server processing time and the proxy waiting time is the second.

For example, in the history management table 112, a record in which the clock time is "09:48:50.012" and the request is "GET/v2/servers" and the server is "SV2" and the processing time is "10.524" and the waiting time is "3.491" is registered.

This indicates that the contents of a request received at a clock time of 9:48:50.012 is "GET/v2/servers" and the request has been distributed to the processing server 300a and the server processing time is 10.524 seconds and the proxy waiting time is 3.491 seconds.

In the history management table 112, the server processing time and the proxy waiting time are registered regarding each of requests and the processing servers of the distribution destinations.

FIG. 9 is a diagram illustrating an example of a statistic table. A statistic table 113 is stored in the storing unit 110. The statistic table 113 includes items of a 90 percentile processing time and a 90 percentile waiting time.

In the item of the 90 percentile processing time, the 90 percentile value of the server processing time relating to the latest N (N is an integer equal to or larger than 2) requests is registered. In the item of the 90 percentile waiting time, the 90 percentile value of the proxy waiting time relating to the latest N requests is registered. The unit of all values registered in the statistic table 113 is the second.

For example, in the statistic table 113, information in which the 90 percentile processing time is "8.54" and the 90 percentile waiting time is "3.42" is registered.

Here, the 90 percentile value is one example of the statistic. Besides the 90 percentile value, a 95 percentile value, a 99 percentile value, a median value (50 percentile value), or the like may be employed as the statistic. Furthermore, the average of the server processing time and the proxy waiting time relating to the latest N requests may be employed as the statistic.

An M percentile value (M is a positive integer) represents the M-th smallest value when the number of samples is 100. When N=100 is assumed, the 90 percentile value of the server processing time is the value of the 90-th shortest server processing time among the server processing times relating to the latest 100 requests. As the statistic, for example, it is preferable to employ a statistic that may reflect a comparatively-large value among samples like the 90 percentile value. This is because the difference between the server processing time and the proxy waiting time readily appears.

Figure 10:
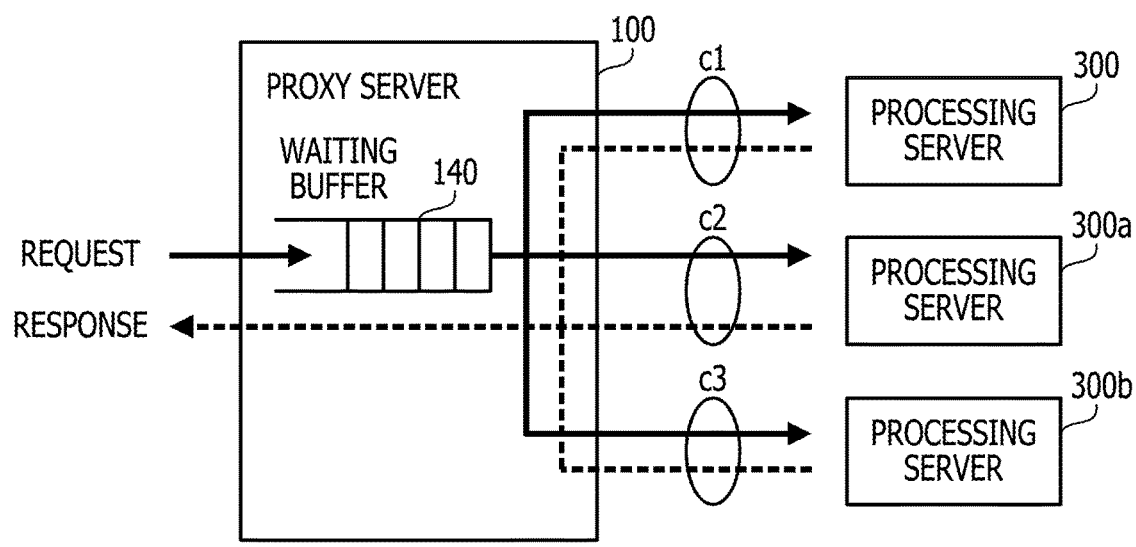
FIG. 10 is an example of initial setting of the maximum number of simultaneous couplings.

FIG. 10 is an example of initial setting of the maximum number of simultaneous couplings. The proxy processing unit 130 manages the number of simultaneous couplings for each of the processing servers 300, 300a, and 300b.

The setting processing unit 120 carries out setting of the maximum number of simultaneous couplings used for distribution processing by the proxy processing unit 130. The maximum number of simultaneous couplings is set for each of the processing servers 300, 300a, and 300b. Here, it is assumed that the processing servers 300, 300a, and 300b are identified based on a number k (k is a natural number) included in the identification information "SV1" and so forth, and the maximum number of simultaneous couplings in units of processing server is represented as $c_k$ (k is a natural number). In this case, the maximum number c of simultaneous couplings of the whole of the processing servers 300, 300a, and 300b is $c=\Sigma c_k$. Here, $\Sigma$ represents calculation of the sum about k.

The setting processing unit 120 sets the initial value of the maximum number c of simultaneous couplings to a minimum value $c_{min}$. The minimum value $c_{min}$ is defined in advance as the maximum number of simultaneous couplings minimally obtained in service provision to the client, for example. At this time, $c_k$ is set to be even among the processing servers 300, 300a, and 300b (for example, if $c_{min}=15$, $c_k=15/3=5$ is set).

If the maximum number c of simultaneous couplings is small relative to the number of requests, the number of requests that accumulate in the waiting buffer 140 increases. Correspondingly, the proxy waiting time increases and the server processing time decreases. If the maximum number c of simultaneous couplings is large relative to the number of requests, the number of requests that accumulate in the waiting buffer 140 decreases. Correspondingly, the proxy waiting time decreases and the server processing time increases.

Next, the processing procedure of the proxy server 100 will be described.

Figure 11:
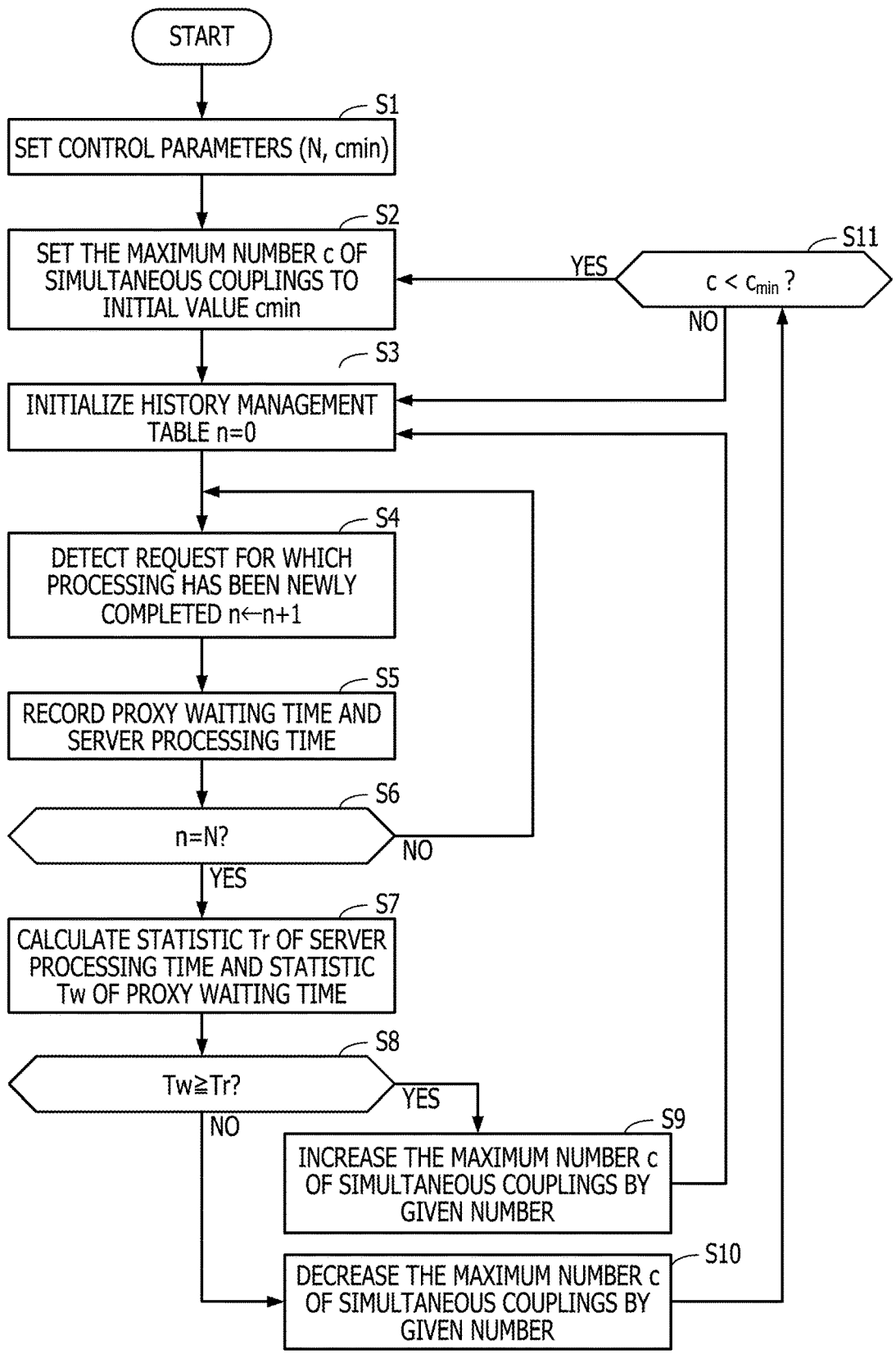
FIG. 11 is a flowchart illustrating a processing example of a proxy server.

FIG. 11 is a flowchart illustrating a processing example of a proxy server. The processing represented in FIG. 11 will be described below along the step number. Execution of the procedure whose starting point is a step S1 to be described below is started after activation of the proxy server 100, with activation of the setting processing unit 120 serving as the trigger, for example.

(S1) The setting processing unit 120 carries out setting of the control parameters used for distribution processing of the proxy processing unit 130. The control parameters include N for deciding the calculation timing of statistics and the initial value $c_{min}$ of the maximum number c of simultaneous couplings. For example, the setting processing unit 120 sets N=100 and $c_{min}=15$.

(S2) The setting processing unit 120 sets the maximum number c of simultaneous couplings to the initial value $c_{min}$. In this case, if the total number of processing servers 300, 300a, and 300b is defined as K (=3), the maximum number $c_k$ of simultaneous couplings of each of the processing servers 300, 300a, and 300b is $c_k=c_{min}/K=c_{min}/3$. The proxy processing unit 130 starts the distribution processing of requests to the respective processing servers 300, 300a, and 300b based on the maximum number $c_k$ of simultaneous couplings.

(S3) The setting processing unit 120 initializes the history management table 112 stored in the storing unit 110. For example, the setting processing unit 120 deletes records registered in the history management table 112. Furthermore, the setting processing unit 120 sets a counter n used for counting of the number of times of reception of a request to n=0.

(S4) The setting processing unit 120 detects a request regarding which processing has been newly completed by any processing server 300, 300a, or 300b. Thereupon, the setting processing unit 120 increments n (substitutes n+1 into n). When the request regarding which processing has been completed arises, the proxy processing unit 130 outputs a log (for example, log 111) and stores the log in the storing unit 110.

(S5) The setting processing unit 120 records the proxy waiting time and the server processing time in the history management table 112 based on the log output by the proxy processing unit 130. As described above, the setting processing unit 120 refers to fields of the acceptance clock time of the request, the contents of the request, the identification information of the processing server, the server processing time, and the proxy waiting time among records of the log and obtains values to be registered in the respective items of the history management table 112.

(S6) The setting processing unit 120 determines whether or not n=N is satisfied. If n=N is satisfied, the processing is forwarded to a step S7. If n=N is not satisfied, the processing is forwarded to the step S4.

(S7) The setting processing unit 120 refers to the history management table 112 and calculates the statistic Tr of the server processing time and the statistic Tw of the proxy waiting time. It is conceivable that, as the statistics, 90 percentile values (alternatively, 95 percentile values, 99 percentile values, or the like) are employed as described above, for example.

(S8) The setting processing unit 120 determines whether or not Tw≥Tr is satisfied. If Tw≥Tr is satisfied, the processing is forwarded to a step S9. If Tw≥Tr is not satisfied (for example, if Tw<Tr is satisfied), the processing is forwarded to a step S10.

(S9) The setting processing unit 120 increases the maximum number c of simultaneous couplings by a given number. The setting processing unit 120 calculates the individual maximum number $c_k$ of simultaneous couplings of the processing servers 300, 300a, and 300b by an expression of $c_k$=c/K and updates the setting of $c_k$. Then, the processing is forwarded to the step S3.

(S10) The setting processing unit 120 decreases the maximum number c of simultaneous couplings by a given number. The setting processing unit 120 calculates the individual maximum number $c_k$ of simultaneous couplings of the processing servers 300, 300a, and 300b by the expression of $c_k$=c/K and updates the setting of $c_k$. Then, the processing is forwarded to a step S11.

(S11) The setting processing unit 120 determines whether or not c<$c_{min}$ is satisfied. If c<$c_{min}$ is satisfied, the processing is forwarded to the step S2. If c<$c_{min}$ is not satisfied (for example, if c≥$c_{min}$ is satisfied), the processing is forwarded to the step S3.

In the steps S9 and S10, the width d of increase or decrease (amount of change) in the maximum number c of simultaneous couplings may be decided according to the difference between the statistics Tw and Tr. For example, it is conceivable that proportional control in the classical control theory is used for the decision of the width d of increase or decrease. For example, the decision is carried out as follows.

First, the setting processing unit 120 calculates an index "error" that represents the difference between Tw and Tr by the following expression (1).

$$\text{error} = \frac{T_w - T_r}{T_w + T_r} \quad (1)$$

[Expression 1]

Here, the denominator in expression (1) is what normalizes the value of "error" to −1<error<1.

The setting processing unit 120 sets the width d of increase or decrease to d=error×$k_p$. Here, $k_p$ is the minimum value $c_{min}$, for example. Furthermore, in the steps S9 and S10, the setting processing unit 120 substitutes c+d into c.

Figure 12:
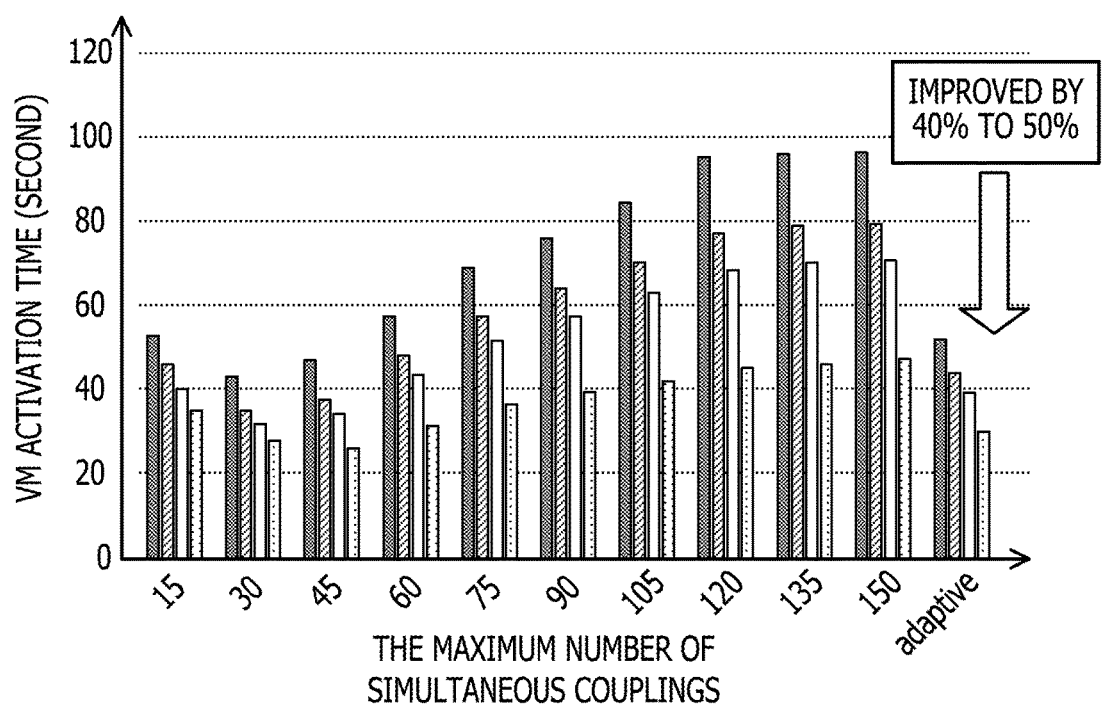
FIG. 12 is a diagram illustrating a suppression example of performance deterioration.
Figure 12:
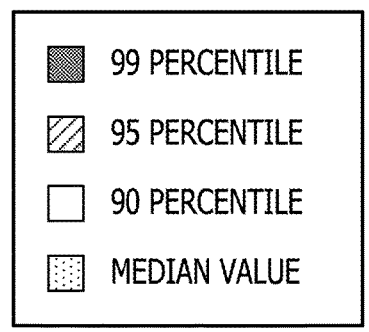

FIG. 12 is a diagram illustrating a suppression example of performance deterioration. The graph of FIG. 12 is a result obtained by measuring the VM activation time (statistic of the activation time of the virtual machine per one virtual machine) while a large number of requests for VM activation by the execution servers 400, 400a, 400b, and 400c are issued by the clients 200 and 200a. For example, the VM activation time is equivalent to the time from reception of the request for VM activation by the proxy server 100 to transmission of a response of activation completion to this request for VM activation to the client as the source of the request. Therefore, the VM activation time is the sum of the proxy waiting time and the server processing time relating to the request for VM activation.

Here, the abscissa axis of the graph of FIG. 12 is the maximum number c of simultaneous couplings. The ordinate axis is the VM activation time (unit is the second). Regarding setting of one maximum number c of simultaneous couplings (here, when the maximum number c of simultaneous couplings is incremented by 15 each time to 15, 30, . . . , 150), a 99 percentile value, a 95 percentile value, a 90 percentile value, and a median value (50 percentile value) of the VM activation time are represented. "adaptive" is a result obtained when the setting of the maximum number c of simultaneous couplings is dynamically changed by the procedure of FIG. 11.

According to the graph of FIG. 12, it turns out that the VM activation time may be improved by approximately 40% to 50% relative to the setting of the maximum number c of simultaneous couplings=120, 135, 150, with which the VM activation time becomes comparatively long.

Figure 13:
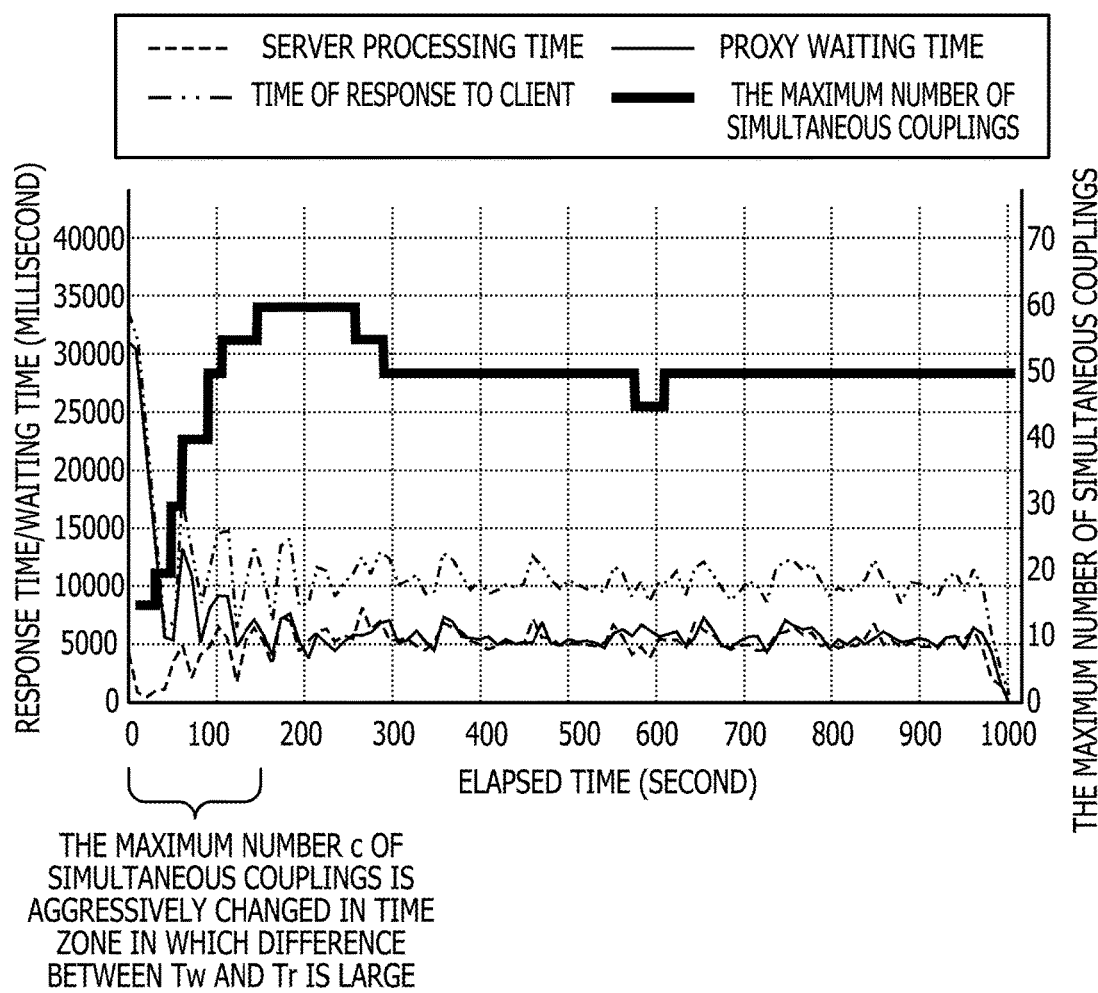
FIG. 13 is a diagram illustrating a change example of the maximum number of simultaneous couplings.

FIG. 13 is a diagram illustrating a change example of the maximum number of simultaneous couplings. The abscissa axis of the graph of FIG. 13 is the elapsed time (unit is the second) from the timing of start of operation with the initial value as the maximum number c of simultaneous couplings. The ordinate axis on the left side of the graph of FIG. 13 is the time (the server processing time, the proxy waiting time, and the time of the response to the client, the unit is the millisecond). The ordinate axis on the right side of the graph of FIG. 13 is the setting value of the maximum number c of simultaneous couplings.

The setting processing unit 120 dynamically changes the maximum number c of simultaneous couplings according to the difference between the statistic Tr of the server processing time and the statistic Tw of the proxy waiting time. In the example of FIG. 13, the difference between Tw and Tr is comparatively large in a time zone of elapsed time 0 seconds to approximately 150 seconds. In the time zone in which the difference between Tw and Tr is comparatively large as above, the setting processing unit 120 aggressively changes the maximum number c of simultaneous couplings (for example, sets the width d of increase or decrease large). On the other hand, in the subsequent time zone in which the difference between Tw and Tr is comparatively small, the setting processing unit 120 sets the width d of increase or decrease in the maximum number c of simultaneous couplings small.

As above, the setting processing unit 120 sets the width d of increase or decrease larger when the difference between the statistics Tw and Tr is larger, and sets the width d of increase or decrease smaller when the difference between the statistics Tw and Tr is smaller. This may advance the decrease in the time of the response to the client and keep the state in which the time of the response to the client is comparatively short for a long time.

In the following, other control examples envisaged in the information processing system of the second embodiment will be described.

Figure 14:
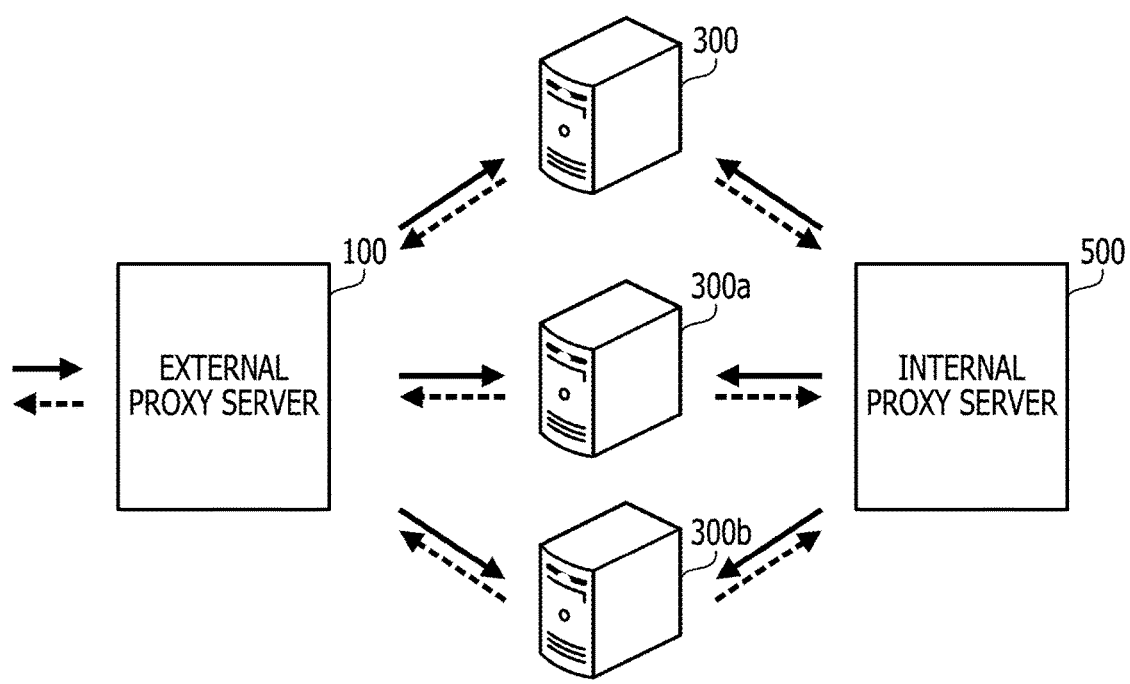
FIG. 14 is a diagram illustrating another control example (first example) of the maximum number of simultaneous couplings.

FIG. 14 is a diagram illustrating another control example (first example) of the maximum number of simultaneous couplings. The processing servers 300, 300a, and 300b mutually communicate through an internal proxy server 500 in some cases besides communicating with the proxy server 100 (in FIG. 14, represented as the external proxy server 100). For example, the internal proxy server 500 is coupled to the network 30. In this case, the external proxy server 100 distributes requests from the clients 200 and 200a to the processing servers 300, 300a, and 300b. On the other hand, the internal proxy server 500 distributes requests from the processing servers 300, 300a, and 300b (API requests) to the processing servers 300, 300a, and 300b.

In this case, it is conceivable that the internal proxy server 500 processes the requests from the processing servers 300, 300a, and 300b without limitation (without setting the maximum number of simultaneous couplings). For example, the processing time of the processing servers 300, 300a, and 300b is preferentially shortened by setting the maximum number of simultaneous couplings regarding distribution of requests on the client side and abolishing the limitation of the maximum number of simultaneous couplings regarding distribution of requests among the processing servers 300, 300a, and 300b.

Figure 15:
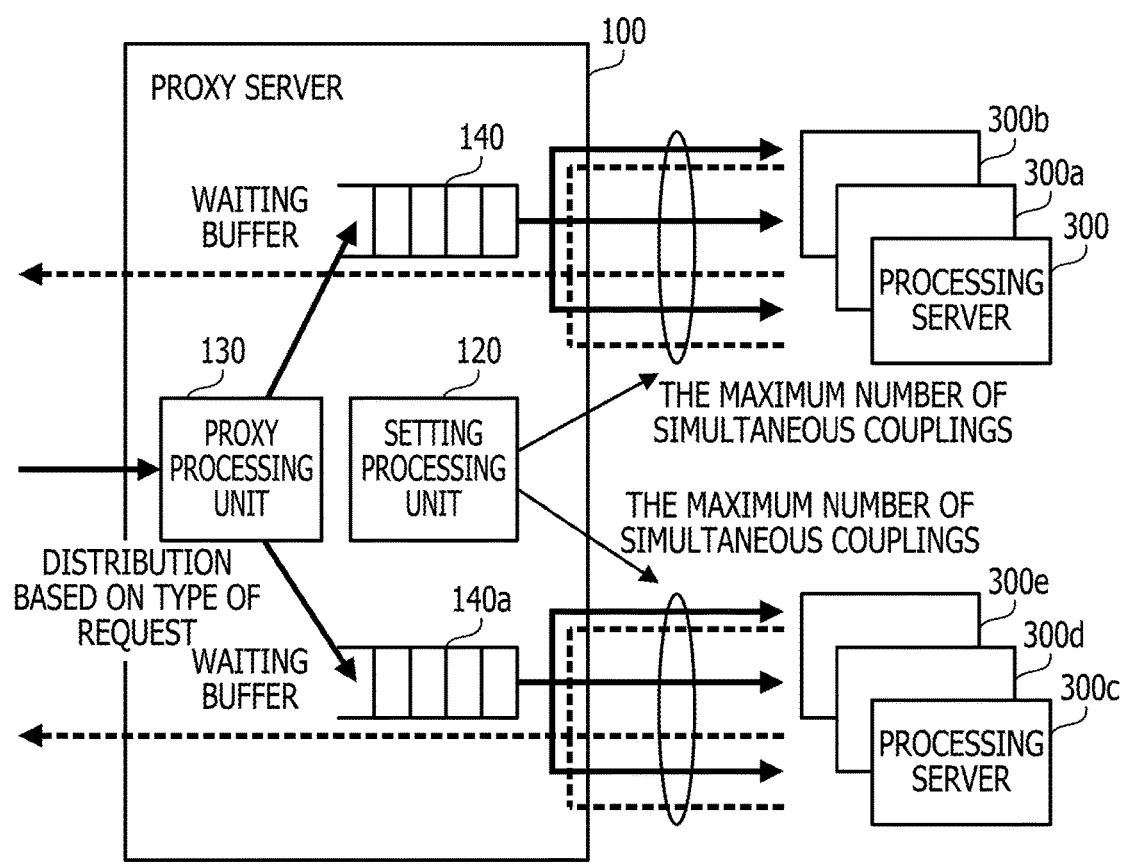
FIG. 15 is a diagram illustrating another control example (second example) of the maximum number of simultaneous couplings.

FIG. 15 is a diagram illustrating another control example (second example) of the maximum number of simultaneous couplings. In some cases, the proxy server 100 distributes a request to a different processing server depending on the type of the request from the client 200 or 200a. The type of the request is classified based on the HTTP method (GET, POST, and so forth) or the URI (whether the resource is an image or is a sound, or the like), for example. For example, suppose that processing servers 300c, 300d, and 300e are coupled to the network 20 in addition to the processing servers 300, 300a, and 300b.

The processing servers 300, 300a, and 300b process requests of a first type. The processing servers 300, 300a, and 300b belong to a first group of processing servers. Furthermore, the processing servers 300c, 300d, and 300e process requests of a second type. The processing servers 300c, 300d, and 300e belong to a second group of processing servers.

In this case, the waiting buffer 140 is used for buffering of the requests of the first type. Furthermore, the proxy server 100 further includes a waiting buffer 140a used for buffering of the requests of the second type.

The proxy processing unit 130 determines the type of a request received from the client 200 or 200a and distributes the received request to the waiting buffer of either group according to the determined type (distribution of a first stage). For example, the proxy processing unit 130 stores a request of the first type received from the client 200 or 200a to the waiting buffer 140. Furthermore, the proxy processing unit 130 stores a request of the second type received from the client 200 or 200a to the waiting buffer 140a. Then, in the group of the distribution destination, the proxy processing unit 130 carries out distribution of this request to the processing server (distribution of a second stage)

In this case, the setting processing unit 120 creates the history management table 112 and the statistic table 113 regarding the first group and the second group separately. Then, the setting processing unit 120 sets the maximum number of simultaneous couplings for the first group, to which the processing servers 300, 300a, and 300b belong. Furthermore, the setting processing unit 120 sets the maximum number of simultaneous couplings for the second group, to which the processing servers 300c, 300d, and 300e belong.

Here, for example, there is the case in which the processing servers 300, 300a, and 300b mainly execute processing in which the load is comparatively large (processing in which image data or the like with a comparatively-large size is treated, or the like). Meanwhile, there is the case in which the processing servers 300c, 300d, and 300e mainly execute processing in which the load is comparatively small (processing in which data with a comparatively-small size is treated, or the like). In such a case, if the statistics Tw and Tr are acquired with requests to both server groups mixed, it becomes difficult to set the maximum number of simultaneous couplings commensurate with the difference in the contents of processing by both server groups. Therefore, as described above, the setting processing unit 120 may set the maximum number of simultaneous couplings according to the contents of processing on the processing server side by adjusting the maximum number of simultaneous couplings for each of groups of processing servers according to the type of the request.

The setting processing unit 120 may change the maximum number of simultaneous couplings at timings different for each type of the request. For example, the setting processing unit 120 may set the history management table 112 and the statistic table 113 for each type of the request and carry out the procedure of FIG. 11 for each type of the request concurrently.

Figure 16:
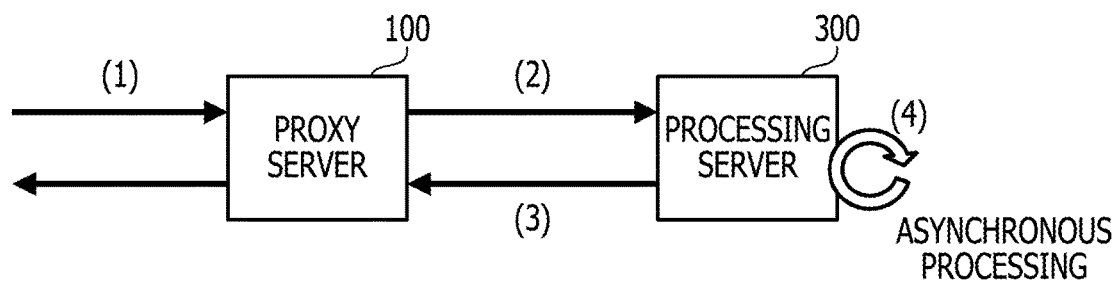
FIG. 16 is a diagram illustrating another control example (third example) of the maximum number of simultaneous couplings.

FIG. 16 is a diagram illustrating another control example (third example) of the maximum number of simultaneous couplings. The processing servers 300, 300a, and 300b execute asynchronous processing in some cases. The asynchronous processing is processing executed according to a request in the processing server 300 after transmission of a response by the processing server 300. A concrete sequence relating to the asynchronous processing is as follows. (1) The proxy server 100 receives a request. (2) The proxy server 100 transmits the request to the processing server 300. (3) The processing server 300 transmits a response according to the request to the proxy server 100. (4) The processing server 300 asynchronously executes processing according to the request (executes asynchronous processing).

In this case, the setting processing unit 120 may obtain the statistic Tr of the server processing time in consideration of the asynchronous processing.

Figure 17:
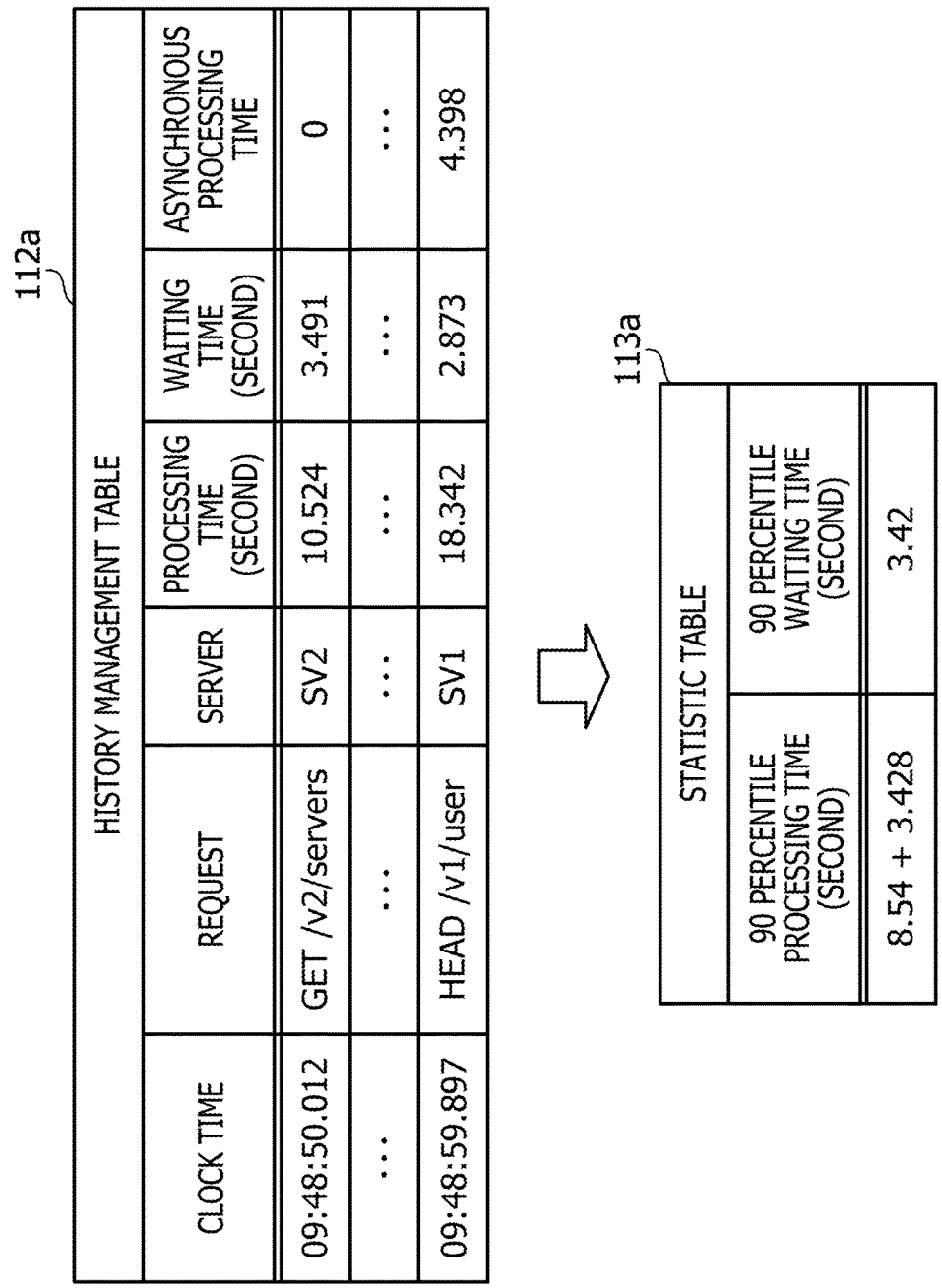
FIG. 17 is a diagram illustrating an example of a history management table in the control example (third example).

FIG. 17 is a diagram illustrating an example of a history management table in the control example (third example). For example, the storing unit 110 stores a history management table 112a obtained by adding an item of an asynchronous processing time to the history management table 112 instead of the history management table 112.

In the item of the asynchronous processing time, the execution time (unit is the second) of asynchronous processing in the processing server of the forwarding destination of the request is registered. For example, in the history management table 112a, a record in which the asynchronous processing time in the processing server 300a is "0" (second) regarding a request "GET/v2/servers" is registered. Furthermore, in the history management table 112a, a record in which the asynchronous processing time in the processing server 300 is "4.398" (seconds) regarding a request "HEAD/v1/user" is also registered.

The setting processing unit 120 may acquire the asynchronous processing time relating to each request from the processing servers 300, 300a, and 300b by inquiring the asynchronous processing time relating to each request of the processing servers 300, 300a, and 300b, for example. Alternatively, a Syslog server that receives logs of processing executed by the processing servers 300, 300a, and 300b may be operated on the proxy server 100. In this case, the setting processing unit 120 acquires the asynchronous processing time of each request by analyzing the logs acquired by the Syslog server.

The setting processing unit 120 employs the value obtained by adding the statistic of the asynchronous processing time to the statistic of the time recorded in the item of the processing time in the history management table 112a as the statistic Tr of the server processing time. For example, as represented in a statistic table 113a, the setting processing unit 120 employs, as Tr, a value obtained by adding the 90 percentile value (8.54) of the value of the processing time in the history management table 112a and the 90 percentile value (3.428) of the value of the asynchronous processing time. For example, the setting processing unit 120 corrects the statistic of the server processing time described with the diagrams to FIG. 15 based on the asynchronous processing time (or the statistic of the asynchronous processing time) of the processing servers 300, 300a, and 300b and employs the value resulting from the correction as the statistic Tr of the server processing time.

As above, the setting processing unit 120 may set the maximum number of simultaneous couplings by using the statistic Tr of the server processing time registered in consideration of the asynchronous processing time. Due to this, the load of the processing servers 300, 300a, and 300b may be reflected more appropriately regarding the setting of the maximum number of simultaneous couplings.

Here, for example, it is conceivable that the relationship of FIG. 6 is preliminarily surveyed in order to set the maximum number of simultaneous couplings and the maximum number of simultaneous couplings with which the time Tt of the response to the client becomes the minimum is set in the proxy server 100 in advance. However, the environment at the time of the survey is not necessarily kept also at later timing. For example, the maximum number of simultaneous couplings with which the response time Tt takes the minimum possibly changes if the number of clients increases or decreases or if the number of processing servers increases. Furthermore, the environment at the time of the survey does not necessarily correspond with the environment in actual operation. As above, with the static setting based on the preliminary survey or the like, there is a possibility that it is difficult to suppress the deterioration of the quality of service in cloud services.

Therefore, the setting processing unit 120 pays attention to characteristics that is observed in series A1, B1, and C1 in FIG. 6 and does not depend on transformation of the system configuration, and changes the maximum number of simultaneous couplings. For example, according to series A1 and B1, the statistic Tw of the proxy waiting time tends to be large relative to the statistic Tr of the server processing time when the maximum number of simultaneous couplings is smaller. Meanwhile, according to series A1 and B1, the statistic Tr of the server processing time tends to be large relative to the statistic Tw of the proxy waiting time when the maximum number of simultaneous couplings is larger. Therefore, the setting processing unit 120 compares the statistics Tw and Tr and changes the maximum number of simultaneous couplings if there is a difference between the statistics Tr and Tw.

For example, the setting processing unit 120 increases the maximum number of simultaneous couplings if the statistic Tw of the proxy waiting time is equal to or larger than the statistic Tr of the server processing time. Meanwhile, the setting processing unit 120 decreases the maximum number of simultaneous couplings if the statistic Tw of the proxy waiting time is smaller than the statistic Tr of the server processing time. This shifts the time T of the response to the client to a value close to the minimum value.

As above, the setting processing unit 120 may adjust the maximum number of simultaneous couplings to suppress the deterioration of the response performance by dynamically changing the maximum number of simultaneous couplings to the processing servers 300, 300a, and 300b. The deterioration of the time of the response to the client may be especially suppressed compared with the case of statically setting the maximum number of simultaneous couplings by a preliminary survey or the like. For example, the deterioration of the response time may be suppressed even if the load of the processing servers 300, 300a, and 300b varies depending on the time or even if failure occurs. As a result, improvement in the quality of service in cloud services may be intended.

The information processing of the first embodiment may be implemented by causing the processing unit 1b to execute a program. Furthermore, the information processing of the second embodiment may be implemented by causing the processor 101 to execute a program. The program may be recorded in the computer-readable recording medium 13.

For example, the program may be circulated by distributing the recording medium 13 in which the program is recorded. Furthermore, the program may be stored in another computer and be distributed via a network. For example, the computer may store (install) the program recorded in the recording medium 13 or the program received from another computer in a storing device such as the RAM 102 or the HDD 103 and read the program from this storing device to execute the program.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. A number-of-couplings control method performed by a computer, the method comprising:

executing a first process that includes storing a first time and a second time in association with each of a plurality of requests, the first time being a time period between a time when a first request from a first device is received by a communication node and a time when the first request is transmitted to a second device from the communication node, the first request being any of the plurality of requests, the second time being a time period between a time when the first request is transmitted to the second device from the communication node and a time when a response to the first request is received by the communication node from the second device;

storing an execution time of asynchronous processing executed by the second device according to the request after transmission of the response by the second device; and executing a second process that includes:

obtaining a statistic of the first time and a statistic of the second time that are calculated as a function of a number of simultaneous couplings between the first device and the second device;

correcting the statistic of the second time based on the execution time of the asynchronous processing;

changing an upper limit of the number of simultaneous couplings to the second device based on a comparison between the statistic of the first time and the statistic of the second time;

increasing the upper limit when the statistic of the first time is equal to or larger than the statistic of the second time; and decreasing the upper limit when the statistic of the first time is smaller than the statistic of the second time.

2. The number-of-couplings control method according to claim 1, further comprising:

deciding an amount of change in the number of simultaneous couplings based on a difference between the statistic of the first time and the statistic of the second time.

3. The number-of-couplings control method according to claim 1, wherein the statistic of the first time and the statistic of the second time are calculated regarding each of types of the request and the upper limit is changed regarding each of the types.

4. The number-of-couplings control method according to claim 1, wherein when the request is received from the first device, transmission of the request that is received to the second device is limited according to a comparison between the upper limit and the number of requests about each of which the response has not been received among the requests that have been transmitted to the second device.

5. A distributing device comprising:

a memory; and a processor coupled to the memory and configured to:

execute a first process that includes storing, in the memory, a first time and a second time in association with each of a plurality of requests, the first time being a time period between a time when a first request from a first device is received by a communication node and a time when the first request is transmitted to a second device from the communication node, the first request being any of the plurality of requests, the second time being a time period between a time when the first request is transmitted to the second device from the communication node and a time when a response to the first request is received by the communication node from the second device;

storing an execution time of asynchronous processing executed by the second device according to the request after transmission of the response by the second device;

execute a second process that includes:

obtaining a statistic of the first time and a statistic of the second time that are calculated as a function of a number of simultaneous couplings between the first device and the second device;

correcting the statistic of the second time based on the execution time of the asynchronous processing;

changing an upper limit of the number of simultaneous couplings to the second device based on a comparison between the statistic of the first time and the statistic of the second time, increasing the upper limit when the statistic of the first time is equal to or larger than the statistic of the second time, and decreasing the upper limit when the statistic of the first time is smaller than the statistic of the second time.

* * * * *